(12) United States Patent
Rice et al.

(10) Patent No.: US 7,302,016 B1
(45) Date of Patent: Nov. 27, 2007

(54) PHASE ESTIMATOR WITH BIAS CORRECTION

(75) Inventors: Michael Rice, Provo, UT (US);
William K. McIntire, Sandy, UT (US)

(73) Assignee: L-3 Communicaations Corporation, New York, NY (US)

( * ) Notice: Subject to any disclaimer, the term of this patent is extended or adjusted under 35 U.S.C. 154(b) by 826 days.

(21) Appl. No.: 10/640,065

(22) Filed: Aug. 13, 2003

(51) Int. Cl.
H03D 3/22 (2006.01)
(52) U.S. Cl. ............... 375/329; 375/326; 455/553.1
(58) Field of Classification Search ........... 375/329, 375/326; 455/553.1
See application file for complete search history.

(56) References Cited

U.S. PATENT DOCUMENTS

| | | | |
|---|---|---|---|
| 5,473,637 A | 12/1995 | Gardner | ............ 375/329 |
| 6,421,399 B1 * | 7/2002 | Avidor et al. | ............ 375/329 |
| 6,771,713 B1 * | 8/2004 | Lui et al. | ............ 375/326 |
| 6,862,324 B1 * | 3/2005 | Lui et al. | ............ 375/326 |
| 7,054,658 B1 * | 5/2006 | Lobo | ............ 455/553.1 |

OTHER PUBLICATIONS

Lui; Threshold Detection Performance of GMSK Signal with BT=0. 5; IEEE Military Communications Conference Proceedings; MILCOM 1998; vol. 2; Oct. 18-21, 1998; pp. 515-519.*

"Multichannel Maximum-Likelihood Sequence Estimation (MLSE) Equalizer for GSM Using a Parametic Channel Mode", Chen, Jiunn-Tsair, et al., IEEE Transactions on Communications, vol. 47, No. 1, Jan. 1999, pp. 53-63.
"A Note on the Application of the Laurent Decomposition to the GSM GMSK Signaling Waveform", Booth, Richard, 7 pages, undated.
"Symbol Timing Recovery for Generalized Minimum Shift Keying Modulations in Software Radio Receiver", Wu, Yik-Chung, et al., IEEE 0-7803-7206, Sep. 1, 2001, pp. 3303-3305.
"Carrier Synchronization of GMSK Based on the Laurent AMP Representation", Simon, Marvin K., 25 pages, undated.
"Binary GMSK: Characteristics And Performance", Tsai, Kuang, et al., 12 pages, undated.

(Continued)

*Primary Examiner*—Chieh M. Fan
*Assistant Examiner*—Sudhanshu C. Pathak
(74) *Attorney, Agent, or Firm*—Harrington & Smith, PC (57) ABSTRACT

A method and serial detector for demodulating a phase-modulated signal are presented. In particular, a carrier phase estimator applies a phase estimate to an output of a matched serial filter. The filter output is matched to the first Laurent pulse of the received signal, and the phase estimate corrects for a phase bias introduced by using the first Laurent pulse. The method and detector are particularly valuable in Gaussian Minimum Shift Keying (GMSK) modulated systems and where then product of the bandwidth B and the bit rate $T_b$ is less than about 0.3, and where a training sequence in a header of a burst system has a length $L_0$ less than about 5000. Three estimates of phase offset are given, each taking the inner product of x and the conjugate transpose of either a or p; wherein x is a vector of data samples, a is a vector of pseudo symbols, and p is a vector of the data and ISI portions of the samples.

30 Claims, 5 Drawing Sheets

OTHER PUBLICATIONS

"Data-Aided Symbol Time And Carrier Phase Tracking For Pre-Coded CPM Signals", Lui, Gee L., et al., 11 pages, undated.

"Data-Aided Synchronization of Coherent CPM-Receivers", Huber, Johannes, et al., IEEE Transactions on Communications, vol. 40, No. 1, Jan. 1992, pp. 178-189.

"Simple Coherent Receivers for Partial Response Continuous Phase Modulation", Kaleh, Ghassan Kawas, IEEE Journal On Selected Areas In Communications, vol. 7, No. 9, Dec. 1989, pp. 1427-1436.

"Map-Motivated Carrier Synchronization Of GMSK Based On The Laurent AMP Representation", Simon, Marvin K., 4 pages, undated.

* cited by examiner

PHASE ESTIMATOR WITH BIAS CORRECTION

TECHNICAL FIELD

These teachings relate generally to data communications signal processing. This invention is more specifically directed to demodulating a received waveform to correct for a bias of a Gaussian Minimum Shift Keying (GMSK) phase estimate, such as a bias introduced by employing a Laurent decomposition of the waveform.

BACKGROUND

Many wireless communication systems transfer information by modulating the information onto a carrier signal such as a sine wave to more efficiently use the available bandwidth for multiple or intensive communications. The carrier signal is modulated by varying one or more parameters such as amplitude, frequency, and phase. Phase shift keying (PSK) is frequently used, and includes shifting the phase of the carrier according to the content of the information being transmitted. There are several techniques known to modulate a transmission phase including binary phase shift keying (BPSK), quadrature phase shift keying (QPSK), and Gaussian minimum shift keying (GMSK). The power spectral density of both BPSK and QPSK is fairly broad, and these techniques have been found inadequate for certain applications due to interference between closely packed adjacent channels. A signal transmitted with phase shift keying must be demodulated at the receive end of a communication system by estimating the phase shift or offset. Data demodulation is directly dependent upon the accuracy of that estimate of the phase shift.

GMSK is a form of continuous phase modulation, and therefore achieves smooth phase modulation that requires less bandwidth than other techniques. Under GMSK, input bits defining a rectangular waveform (+1, −1) are converted to Gaussian (bell shaped) pulses by a Gaussian smoothing filter. The Gaussian pulse typically is allowed to last longer than its corresponding rectangular pulse, resulting in pulse overlap known as intersymbol interference (ISI). The extent of ISI is determined by the product of the bandwidth (B) of the Gaussian filter and the data-bit duration ($T_b$) or bit rate; the smaller the product, the greater the pulse overlap. Applications using GMSK have been used where the product $BT_b$ is generally 0.3 or greater. Applications with lower $BT_b$ (e.g., ⅕, ⅙, and less) tend to include higher levels of ISI that generally degrade performance to unacceptable levels. This is true because prior art demodulators introduce a phase error (the difference between the actual phase offset in the transmitted signal and the estimate of the phase offset in the received signal) that increases with decreasing $BT_b$.

In a burst transmission system, an estimate of the phase offset is typically included within a header or training sequence of the message stream. Theoretically, where the length $L_0$ of the training sequence approaches infinity, the estimate of the phase offset exactly replicates the actual phase offset and phase error approaches zero. In more pragmatic applications, the use of finite length training sequences results in a discrepancy between the estimate of the phase offset and the actual phase offset. The maximum allowable size of this discrepancy depends upon the demands of a particular communications system. The required training sequence length increases as the maximum allowable discrepancy decreases and as $BT_b$ decreases. Because the training sequence header is present in each transmission burst, shorter training sequences are desirable to ensure that that the available bandwidth is used for substantive data rather than inordinately long training sequences.

Phase error in prior art systems arises during demodulation. While a GMSK waveform defines a constant envelope that is simple to generate and transmit using efficient amplifiers, it is a fairly complex function to demodulate at the receiving end of a communication system.

Pierre Laurent first demonstrated that a GMSK waveform could be represented by amplitude modulated pulses $h_0(t)$, $h_1(t), h_2(t), \ldots$, and a corresponding coherent detector could be designed. This representation is known as the Laurent decomposition, and it allowed bit error rates (BER) associated with GMSK communications to match those of other PSK techniques. Prior art has demonstrated that detectors based on only the first two amplitude pulses, $h_0(t)$ and $h_1(t)$, or only the first amplitude pulse $h_0(t)$, provide adequate performance for most applications.

Many GMSK systems calculate the phase estimate as the angle resulting from the inner product of two vectors, one representing pseudo symbols (which are related to channel symbols and the modulation index) and the other representing the filter output (which is matched to the first Laurent pulse). The above approach yields only an approximation since the last L filter outputs, $x(L_0-1-L), x(L_0-L), \ldots, x(L_0-1)$, are integrated over less than a full symbol, because the first Laurent pulse spans $(L+1)T_b$ seconds. This is the bias in demodulating a GMSK signal that has previously limited GMSK systems to about $BT_b > 0.3$ and high $L_0$. At those system parameters, the above bias in the Laurent decomposition can be ignored without adverse effect on demodulation at the receive end of the communication. At lower $BT_b$ using shorter $L_0$, the bias becomes more significant and cannot be ignored; the bias signal drives the phase estimate further from the true phase modulation, causing the BER to rise.

SUMMARY OF THE PREFERRED EMBODIMENTS

The foregoing and other problems are overcome, and other advantages are realized, in accordance with the presently preferred embodiments of these teachings. A method for demodulating a phase-modulated signal is one aspect of the present invention. The method includes receiving a carrier signal r(t) that includes a known number of training bits $L_0$. The received carrier signal is then passed through a matched filter having a filter output. The filter output is sampled and the samples are then combined into a sample vector $x = e^{j\theta} p + v$ defining elements $[x(0), x(1), x(2), \ldots x(L_0-1)]^T$. For brevity, bold indicates vectors. In the vector x, θ is a phase of the carrier signal, p is a vector defining elements $[p(0), p(1), p(2), \ldots p(L_0-1)]^T$ that represents data and intersymbol interference (ISI) of the vector x, and v is a noise vector. The method further includes determining a phase estimate from an angle between the sample vector x and a vector derived from one of a pseudo-symbol vector a and the vector p.

Preferably, the phase estimate is the inner product of x and the conjugate transpose vector $a^H$ with a phase bias estimate subtracted therefrom, the phase bias estimate being the inner product of p and $a^H$. In a most preferred embodiment, the elements of $a^H$ alternate between purely real and purely imaginary pseudo symbols ±1 and ±j. Alternatively, the phase estimate is the inner product of x and the conjugate transpose vector $p^H$, of the inner product of x, $p^H$, and $R_h^{-1}$, wherein $R_h^{-1}$ is the autocovariance matrix of the noise vector v scaled by $2/N_0$ or the variance. Each of these alternative phase estimates are unbiased, so there is no need to subtract a phase bias estimate therefrom.

In accordance with another aspect of the present invention, a serial detector for demodulating a received phase-modulated signal is described. The detector includes a matched filter, a sampler, and a phase estimator block. The matched filter receives a signal r(t) that defines a carrier phase θ. The sampler has an input coupled to an output of the matched filter and outputs a plurality of discrete samples x. Each of the samples x are of the form $x=e^{j\theta}p+v$, using the same notation as described in the paragraphs above. The phase estimator block has an input coupled to an output of the sampler and determines a phase estimate. The phase estimate is derived from an angle between a sample vector x and a vector derived from one of a and p, wherein the vector x comprises elements x, the vector a comprises pseudo symbol elements, and the vector p comprises elements p.

Preferably, the phase estimate is as described in the above paragraphs describing the method of practicing the invention. In either aspect, use of the present invention is particularly advantageous when used with training sequences in the header of a transmission burst that is less than about $L_0$=about 5000 bits, and/or when $BT_b$<about 0.3, wherein B represents bandwidth and $T_b$ represents bit or symbol rate.

BRIEF DESCRIPTION OF THE DRAWINGS

The foregoing and other aspects of these teachings are made more evident in the following Detailed Description of the Preferred Embodiments, when read in conjunction with the attached Drawing Figures, wherein:

FIG. 2A is for $BT_b$=⅕ and L=5, whereas FIG. 2B is for $BT_b$=½ and L=2.

DETAILED DESCRIPTION OF THE PREFERRED EMBODIMENTS

GMSK is a constant envelope waveform, and the transmitted signal may be represented by:

$$z(t)\exp\{j\phi(t;\alpha)\}, \quad [1]$$

$$\text{wherein } \phi(t;\alpha) = \pi h \sum_n \alpha_n g(t-T_b), \quad [2]$$

$$\alpha_n \in \{-1, 1\},$$

$$g(t) = \int_{-\infty}^t f(x)dx,$$

where f(x) is the frequency pulse shape which is a unit area Gaussian pulse with a 3-dB bandwidth B and which is truncated to a length $LT_b$. In practice, $LT_b$ is usually set to 1/B. For minimum shift keying, the modulation index h=½.

An alternate amplitude modulated pulse (AMP) is also possible, wherein z(t) is expressed as a superposition of $2^{L-1}$ time and phase shifted amplitude modulated pulses:

$$z(t) = \sum_{k=0}^{2^{L+1}-1} \sum_n a_{k,n} h_k(t-nT_b). \quad [3]$$

In the Laurent decomposition, the $a_{k,n}$ are the pseudo-symbols which are related to the channel symbols $\alpha_n$ and the modulation index h. The $h_k(t)$ are the amplitude pulses that are a function of g(t), h and L.

The Laurent AMP representation suggests a linear detector structure consisting of $2^{L-1}$ matched filters: one filter matched to each of the Laurent pulses $h_k(t)$. Since the pulses $h_k(t)$ do not satisfy the Nyquist condition for no ISI, maximum likelihood (ML) sequence estimation using the $2^{L-1}$ parallel matched filter outputs is required. The Laurent representation also provides a guide for studying the tradeoff between performance and complexity. The detector structure can be simplified by truncating the Laurent representation to fewer than $2^{L-1}$ pulses. For example, a linear detector for GMSK with $BT_b$=¼ and L=4 based on two matched filters (rather than $2^{L-1}$=8 matched filters) achieves the performance of the optimal detector for all practical purposes. The same result for two matched filters was shown for $BT_b$>⅕.

Simple linear detectors based on the first Laurent pulse have been examined under the names "serial detector", "threshold detector" and "MSK-type detector". As used herein, the term serial detector indicates serial architecture comprising at least the first Laurent amplitude pulse $h_0(t)$ followed by a sampler, with symbol detection performed by subsequent digital signal processing. In general, the performance of the serial detector approach is worse than that of the detector using two matched filters, especially as $BT_b$ gets smaller. In these cases, ISI increases so that a Viterbi-based ML sequence estimator or equalizer must follow the matched filter. One exception to this trend is the case of severe adjacent channel interference. In this case, the serial detector with an equalizer outperforms the serial detector based on the first two Laurent pulses in the detector. This is due to inclusion of the second Laurent pulse in the detector. It has a wider bandwidth than the first pulse, thus allowing more energy from the adjacent channels into the decision making process.

Carrier phase synchronization for GMSK has been studied both in theory and in practice. The prior art shows a ML carrier phase estimator can be derived assuming a serial or MSK-type detector. Similarly, a phase lock-loop-based phase estimator has been proposed that bases the phase error signal on the same quantity. This disclosure focuses on data aided carrier phase estimation as applied to a serial detector with a single filter matched to at least the first Laurent pulse. Once the bias in the phase error estimate is removed, the performance of a ML estimator is able to achieve the Cramer-Rao bound.

Serial Detector Structure

Figure 1:
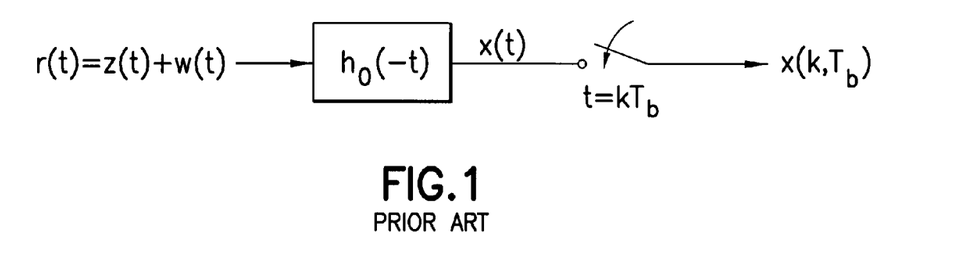
FIG. 1 is a block diagram of a serial detector based on a truncated Laurent representation as known in the art.

A serial detector, FIG. 1, consists of a filter matched to the first Laurent pulse $h_0(t)$ given by:

$$h_0(t) = \prod_{i=0}^{L-1} c(t - iT_b - LT_b), \quad [4]$$

where, for $h=\frac{1}{2}$, $c(t)$ is given by:

$$c(t)\begin{Bmatrix} \cos(\frac{\pi}{2} g(|t|)) \to |t| \leq LT_b \\ 0 \to |t| > LT_b \end{Bmatrix}. \quad [5]$$

The filter $h_0(t)$ spans $(L+1)T_b$ seconds and introduces ISI spanning $2(L+1)$ symbols. The matched filter output $x(t)$ is sampled at the bit rate, every $T_b$ seconds. For large values of $BT_b$, the sign of $x(kT_b)$ can be used as a decision for $a_k$ with reasonably good performance. For smaller values of $BT_b$, a ML sequence estimator or equalization must be used. The first psuedo symbol stream $a_{0,k}=a_k$ (the first subscript is dropped since only the first Laurent pulse $h_0$ is considered) is related to the data symbols $\alpha$ by:

$$a_n = (\sqrt{-1})^{\sum_{m=0}^{n} \alpha_m}. \quad [6]$$

As a consequence, the pseudo symbols alternate between purely real (for even indices) and purely imaginary (for odd indices). For this reason, a slicer that follows the matched filter need only examine the real or imaginary parts of the matched filter output at alternating bit times.

Figure 2A:
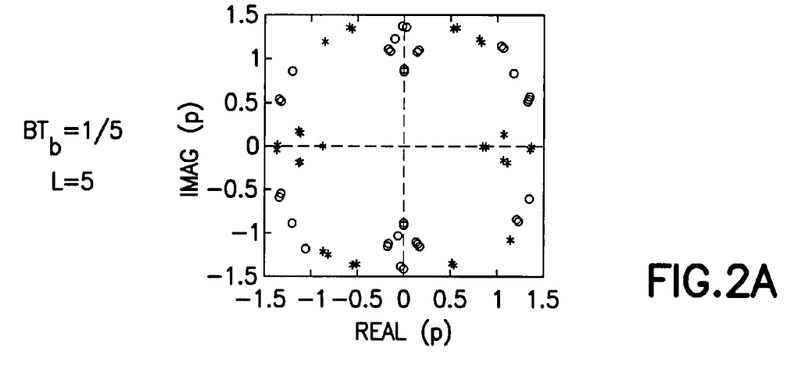
FIGS. 2A-2B are graphs of data+ISI components of a matched filter output along real and imaginary axes.
Figure 2B:
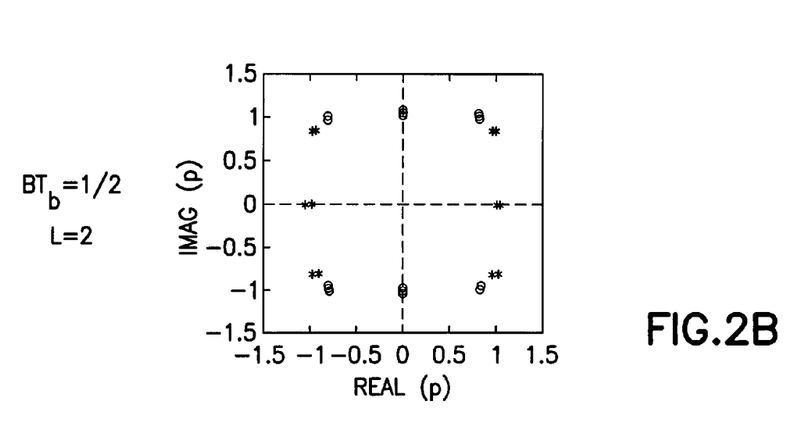

Let $r(t)=z(t)+w(t)$ be the equivalent complex baseband received signal, where $w(t)$ is a zero mean complex Gaussian random process whose real and imaginary parts have power spectral density $N_0/2$ Watt/Hz. The sampled matched filter output may be expressed as:

$$x(kT_b)=p(k)+v(k), \quad [7]$$

where $p(k)$ denotes the contribution of the k-th data symbol as well as the adjacent $2(L+1)$ data symbols to the matched filter output. Thus, $p(k)$ quantifies the intersymbol interference at the matched filter output as illustrated in FIG. 2. Even-indexed points (denoted by an asterisk *) are clustered about the real axis and odd-indexed points (denoted by a circle) are clustered around the imaginary axis in each of FIGS. 2A and 2B. FIG. 2A represents $BT_b=\frac{1}{5}$ and L=5, whereas FIG. 2B represents $BT_b=\frac{1}{2}$ and L=2. The larger value of $BT_b$ in FIG. 2B shows the severity of the ISI is decreased and the clusters reduce to a single point. In the middle of each quadrant (FIGS. 2A and 2B) are both even and odd indexed points, which are also due to ISI which cross correlates the real and imaginary components.

By approximating the transmitted signal using only the first Laurent pulse, $p(k)$ can be approximated by:

$$p(k) \approx \sum_{n=k-L}^{k+L} a_n R_h(-n), \quad [8]$$

where $R_h(n)$ is the deterministic autocorrelation function for the first Laurent pulse given by:

$$R_h(n) \int_0^{(L+1)T_b} h_0(t + nT_b) h_0(nT_b) dt. \quad [9]$$

The second term $v(k)$ in equation [7] above is due to noise and is given by:

$$v(k) = \int_{kT_b}^{(L+1+k)T_b} w(t) h_0(t - kT_b) dt. \quad [10]$$

The sequence $v(k)$ is a sequence of correlated Gaussian random variables with autocorrelation function:

$$R_v(n) = E\{v(k+n)v^*(k)\} = \sigma^2 R_h(n). \quad [11]$$

Carrier Phase Estimation

ML Phase Estimation Observing the Received Signal

The received signal can be given by:

$$R(t)=z(t)e^{j\theta}+w(t), \quad [12]$$

where $\theta$ is the unknown carrier phase offset. For data aided carrier phase estimation, assume $L_0$ known bits are available to aid the estimator, such as is typical in a burst mode application with a header or training sequence. The prior art provides the ML estimator for $\theta$ after observing $r(t)$ in the interval $0 \leq t \leq L_0 T_b$ is:

$$\theta_{mL}=\arg\{a^H x\}, \quad [13]$$

where $a=[a_0, a_1, a_2, \ldots a_{L0-1}]^T$ is the column vector of psuedo symbols and $x=[x(0), x(1), x(2), \ldots X(L_0-1)]^T$ is the column vector of matched filter outputs. The term "arg" represents the phase angle, or the angle resulting from the inner product of the bracketed vectors. The estimator $\theta_{ML}$ is only an approximation since the last L matched filter outputs result from integrations over a portion of the symbol since $h_0(t)$ spans $(L+1)T_b$ seconds. The inaccuracies due to this approximation are termed "edge effects', which diminish as the length $L_0$ of the training sequence increases, or as $BT_b$ increases. The edge effects cause the variance of the phase error estimate to increase because edge effects introduce bias into the phase error estimate. An expression for the bias is derived and applied below.

First, let $x=e^{j\theta}p+v$, wherein $x=[x(0), x(1), x(2), \ldots x(L^0-1)]^T$ is the vector matched filter outputs, $p=[p(0), p(1), p(2), \ldots p(L_0-1)]^T$ is the vector representing the data plus ISI contribution to the matched filter output, and $v=[v(0), v(1), v(2), \ldots v(L_0-1)]^T$ is the vector of correlated noise samples at the matched filter output. The vector v is a jointly Gaussian random variable with zero mean and autocovariance matrix M given by:

$$M = \sigma^2 \begin{bmatrix} R_h(0) & R_h(-1) & \ldots & R_h(L_0+1) \\ R_h(1) & R_h(0) & \ldots & R_h(L_0+2) \\ \vdots & \vdots & \ddots & \vdots \\ R_h(L_0-1) & R_h(L_0-2) & \ldots & R_h(0) \end{bmatrix} = \sigma^2 R_h. \quad [14]$$

Substituting yields:

$$a^H x = a^H(e^{j\theta}p+v) = e^{j\theta}a^H p[1+e^{-j\theta}(a^H v/a^H p)], \quad [15]$$

so that $$\arg\{a^H x\} = \theta + \arg\{a^H p\} + \arg\{1+e^{-j\theta}(a^H v/a^H p)\}. \quad [16]$$

This shows that $\arg\{a^H x\}$ consists of the true phase $\theta$, a bias term $\arg\{a^H p\}$, and a remaining noise term. The bias term, $\theta_{bias} = \arg\{a^H p\}$, diminishes as the approximation of equation [8] improves. If equation [8] were exact, then $p = R_h a$ and $\theta_{bias} = \arg\{a^H p\} = \arg\{a^H R_h a\} = 0$.

The noise term contains the complex valued random variable $u = e^{-j\theta}(a^H v/a^H p)$, which is a zero mean Gaussian random variable whose real and imaginary parts have variance $[1/(2E_b/N_0)][(a^H R_h a)/(|a^H p|^2)]$. The last term in equation [16] (the noise term) may be expressed as:

$$\arg\{1+e^{-j\theta}(a^H v/a^H p)\} = \arg\{1+u\} = \tan^{-1}[Im\{u\}/(1+Re\{u\})] \sim Im\{u\}, \quad [17]$$

where the last approximation holds for $L_0$ sufficiently large so that the variance of $Im\{u\}$ and $Re\{u\}$ are small relative to 1. Taking the bias into account, the ML estimate is redefined to be:

$$\theta_{ML} = \arg\{a^H x\} - \theta_{bias}. \quad [18]$$

The mean and variance of the phase error $\theta_{ML} - \theta$ are:

$$E\{\theta_{ML} - \theta\} \sim E\{\theta + \arg\{a^H p\} + Im\{u\} - \arg\{a^H p\} - \theta\} = 0, \quad [19]$$

and $$E\{|\theta_{ML} - \theta|^2\} \sim E\{|\theta + \arg\{a^H p\} + Im\{u\} - \arg\{a^H p\} - \theta^2\} = [1/(2E_b/N_0)][(a^H R_h a)/(|a^H p|^2)]. \quad [20]$$

This shows that the estimator $\theta_{ML}$ of equation [18] is unbiased and has a variance inversely proportional to signal to noise ratio and $L_0$. As used herein, an estimate $\theta_{est}$ for the unknown parameter $\theta$ is biased if $E\{\theta_{est} - \theta\} \neq 0$.

ML Phase Estimation Observing Matched Filter Outputs

The term $a^H x$ may be interpreted as an operation that re-rotates the matched filter output $x$ by the phase of the data symbols. It is assumed that any residual phase must be due to the carrier phase $\theta$. Since the data dependent phase component of $x$ is due to data and ISI, a de-rotation by $p$ rather than by $a$ would eliminate the need to subtract the bias from the phase estimate.

The estimator then becomes:

$$\theta_{MF} = \arg\{p^H x\}, \quad [21]$$

Wherein the subscript MF stands for matched filter. Substituting $x = e^{j\theta}p + v$ produces:

$$p^H x = p^H(e^{j\theta}p+v) = e^{j\theta}p^H p[1+e^{-j\theta}(p^H v/p^H p)], \quad [22]$$

so that $$\arg\{p^H x\} = \theta + \arg\{p^H p\} + \arg\{1+e^{-j\theta}(p^H v/p^H p)\}). \quad [23]$$

Since $p^H p$ is real, the estimate $\theta_{MF}$ is unbiased. The variance is:

$$E\{|\theta - \theta_{MF}|^2\} = [1/(2E_b/N_0)][(p^H R_h p)/(|p^H p|^2)]. \quad [24]$$

The variance of the estimate $\theta_{MF}$ is greater than that of the estimate $\theta_{ML}$ because the former does not account for the correlation of the noise samples. This correlation can be incorporated into the phase estimate by formulating an ML estimator based on an observation of $L_0$ matched filter outputs. The conditional probability $f(x|a,\theta)$ is:

$$f(x|a,\theta) = [1/\{(2\pi)^{L0/2}|\sigma^2 R_h|^2\}]\exp\{-(1/2\sigma^2)(x-e^{j\theta}p)^H R_h^{-1}(x-e^{j\theta}p)\}, \quad [25]$$

where $\sigma^2 = N_0/2$. Computing the derivative of $\ln[f(x|a,\theta)]$ with respect to $\theta$, setting it to zero, and solving for $\theta$ produces the estimator:

$$\theta_{ML-2} = \arg\{p^H R_h^{-1} x\}. \quad [26]$$

Substituting $x = e^{j\theta}p + v$ produces:

$$p^H R_h^{-1} x = p^H R_h^{-1}(e^{j\theta}p+v) = e^{j\theta}p^H R_h^{-1}p[1+e^{-j\theta}(p^H R_h^{-1}v/p^H R_h^{-1}p)], \quad [27]$$

so that $$\arg\{p^H R_h^{-1} x\} = \theta + \arg\{p^H R_h^{-1} p\} + \arg\{1+e^{-j\theta}(p^H R_h^{-1}v/p^H R_h^{-1}p)\}. \quad [28]$$

Since $p^H R_h^{-1} p$ is real, the estimate $\theta_{ML-2}$ is unbiased. The variance of this estimator is:

$$E\{|\theta - \theta_{MF}|^2\} = [1/(2E_b/N_0)][1/(p^H R_h^{-1} p)]. \quad [29]$$

Numerical Results

Figure 3:
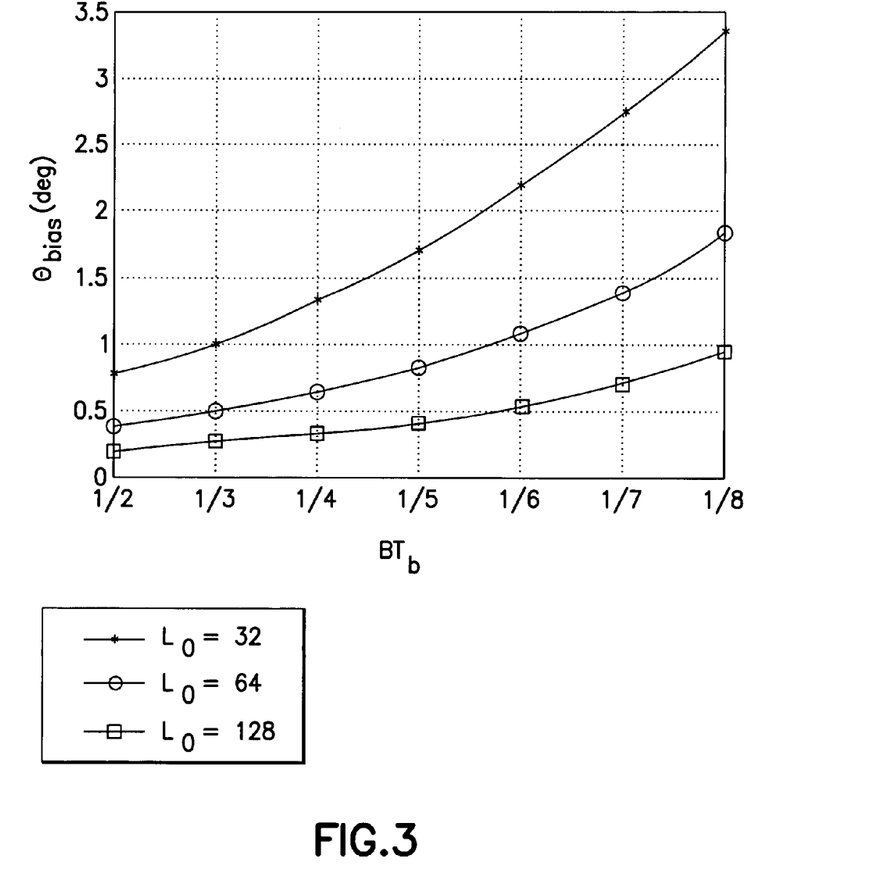
FIG. 3 is a graph showing phase estimator bias as a function of $BT_b$ and training sequence length $L_0$.

The behavior of the ML estimate bias as a function of $BT_b$ and the training sequence length $L_0$ is illustrated in FIG. 3. Not all training sequences $L_0$ produce the same bias. As an example, and for each length $L_0$ plotted in FIG. 3, 10,000 random sequences were generated and the phase bias was computed for each one. The sequence with the largest phase bias was used to generate the plots reproduced in FIG. 3, which demonstrates that the bias increases with decreasing $BT_b$ and/or decreasing $L_0$. Both of these trends are due to the "edge effects" discussed above. As $BT_b$ decreases, length of the first Laurent pulse increases. As a consequence, the number of points in the vector $p$ resulting from "partial integrations" increases. As $L_0$ decreases, the overall influence of the partial integrations increases.

Figure 4:
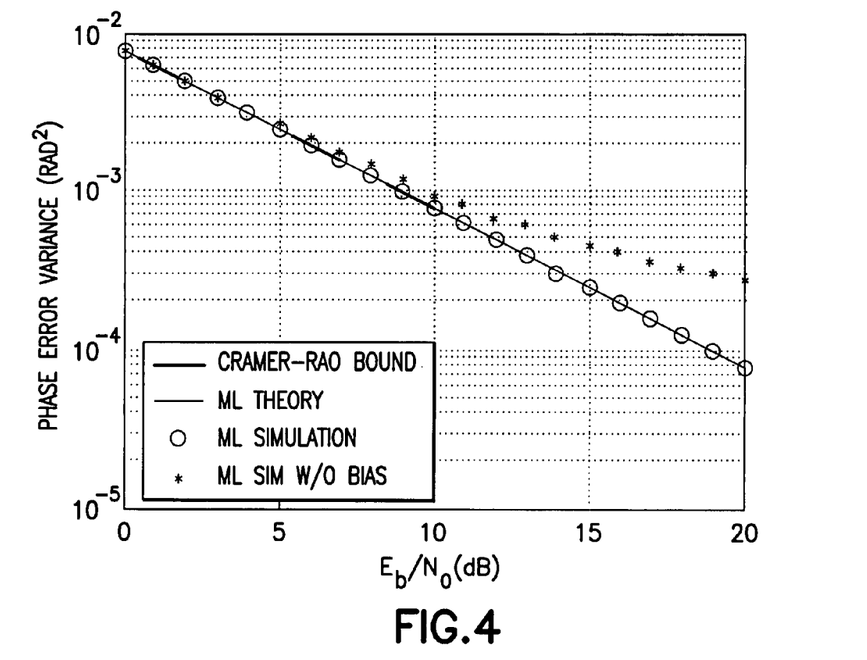
FIG. 4 is a graph showing performance of one estimator of the present invention.

The performance of the ML estimators $\theta_{ML} = \arg\{a^H x\}$ (equation [13]) and $\theta_{ML} = \arg\{a^H x\} - \theta_{bias}$ (equation [18]) is illustrated in FIG. 4 for $BT_b = 1/5$ and $L_0 = 64$. The data sequence used for FIG. 4 is the same as used for FIG. 3. The performance (equation [20]) predicted by the latter estimator (equation [18]) is plotted (the solid line) along with the Cramer-Rao bound (dashed line). The Cramer-Rao bound is not visible since it coincides with the solid line plot of equation [20]. Simulation results are included where the performance of the uncorrected (biased) ML estimator (equation [13]) departs from the Cramer-Rao bound for $E_b/N_0 > 5$ dB. For this combination of $BT_b$ and $L_0$, $E_b/N_0 > 5$ dB is the region where the contribution to phase error due to the uncompensated bias swamps the contribution due to thermal noise. Simulation results for the corrected (unbiased) estimator (equation [18]) show that the bias compensation allows the estimator to achieve the Cramer-Rao bound.

Figure 5:
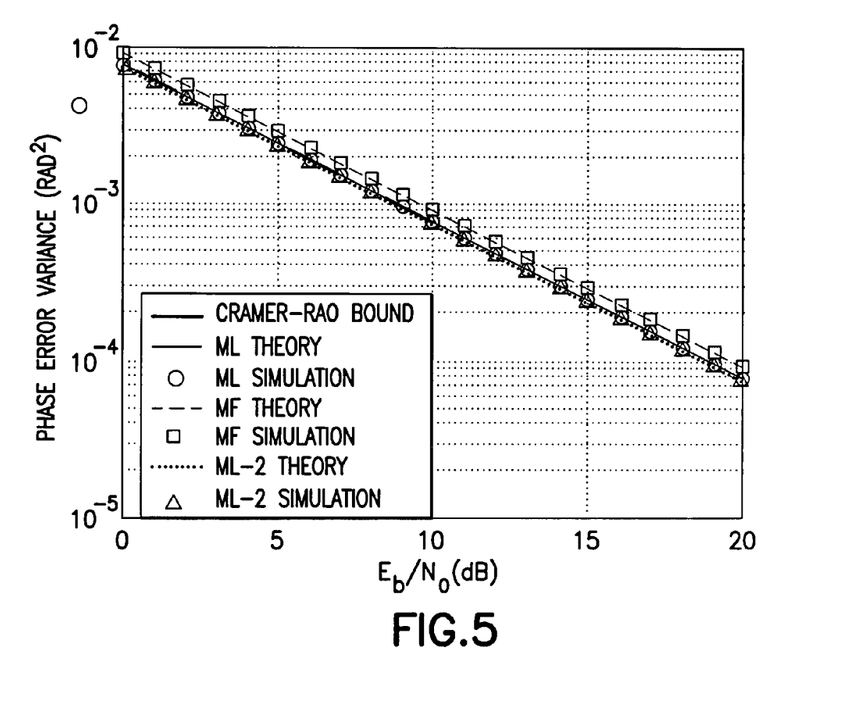
FIG. 5 is a graph showing performance of three estimators of the present invention in comparison to the Cramer-Rao bound.

A performance comparison of the three estimators $\theta_{ML}$, $\theta_{MF}$, and $\theta_{ML-2}$, defined by Equations [18], [21], and [26], respectively, is illustrated in FIG. 5, wherein $BT_b = 1/5$, $L = 5$, and $L_0 = 64$. The phase error variances for the three estimators, given in Equations [20], [24], and [29], are plotted along with simulation results. The simulation results track the predicted performance. Note that the heuristic estimator $\theta_{MF}$ has a higher phase error variance than the other two. The two ML estimators have essentially the same performance. This is to be expected since they are both based on the maximum likelihood principle.

Figure 6A:
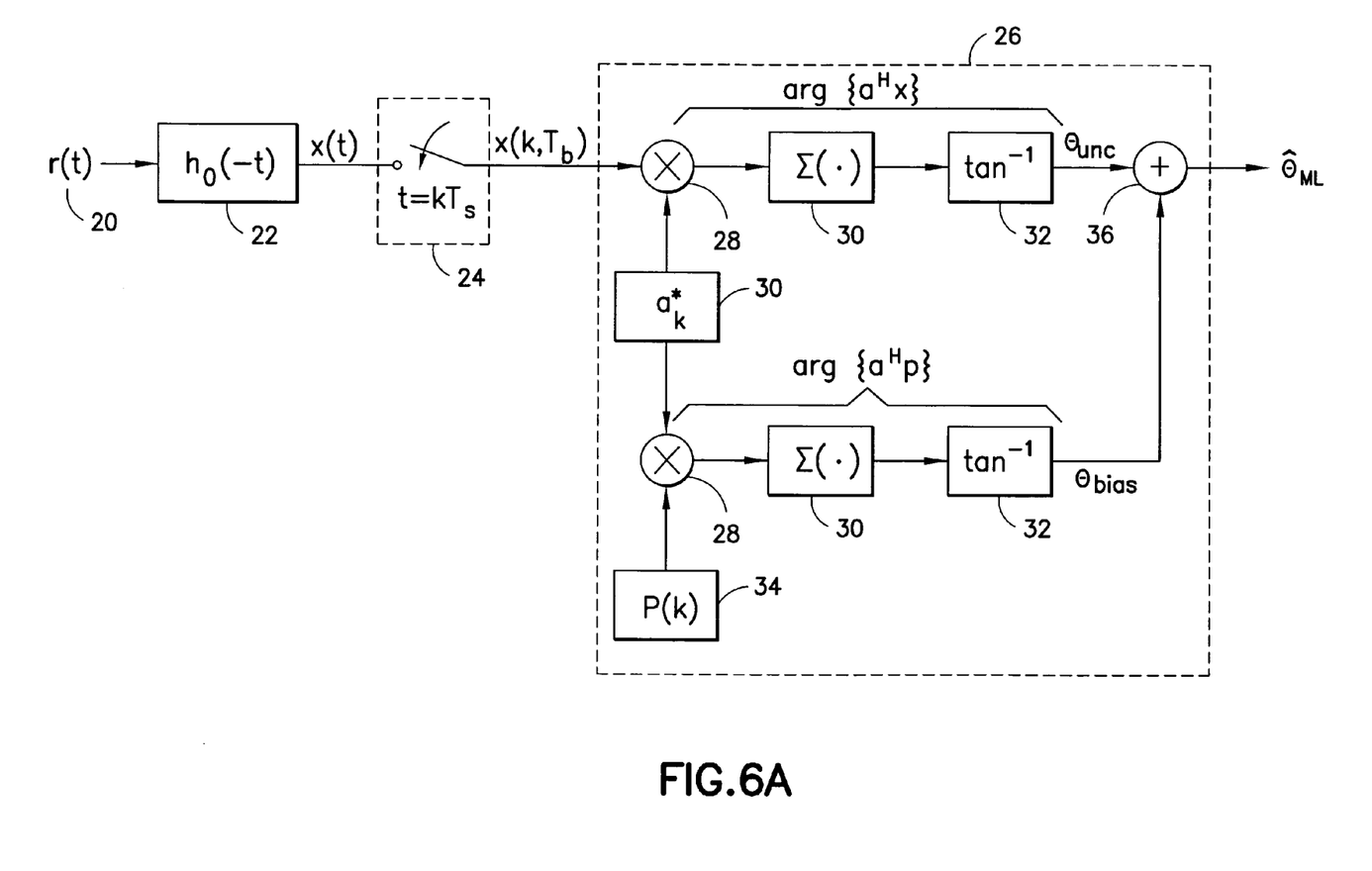
FIGS. 6A-C are block diagrams similar to FIG. 1, each showing a phase estimator according to the present invention.
Figure 6B:
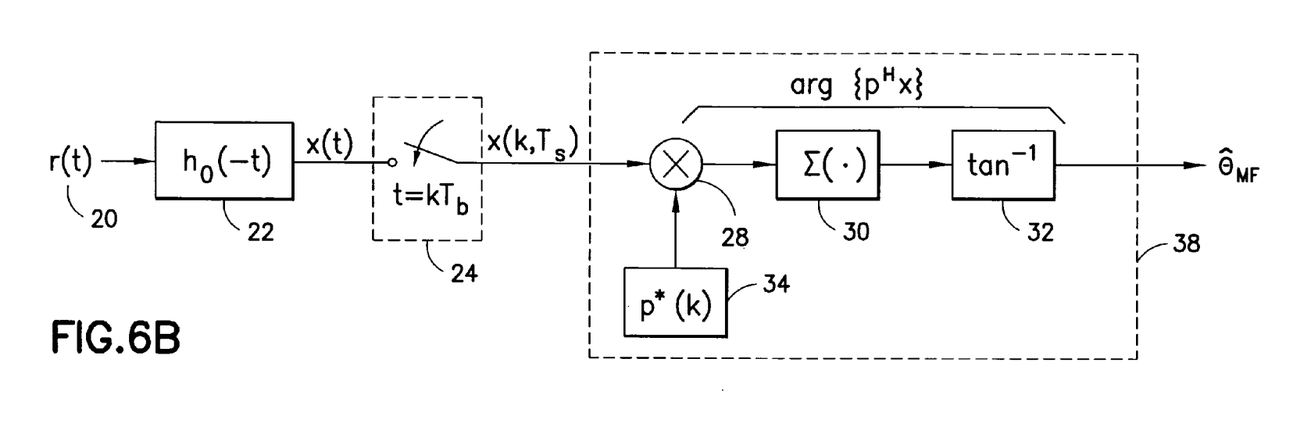
Figure 6C:
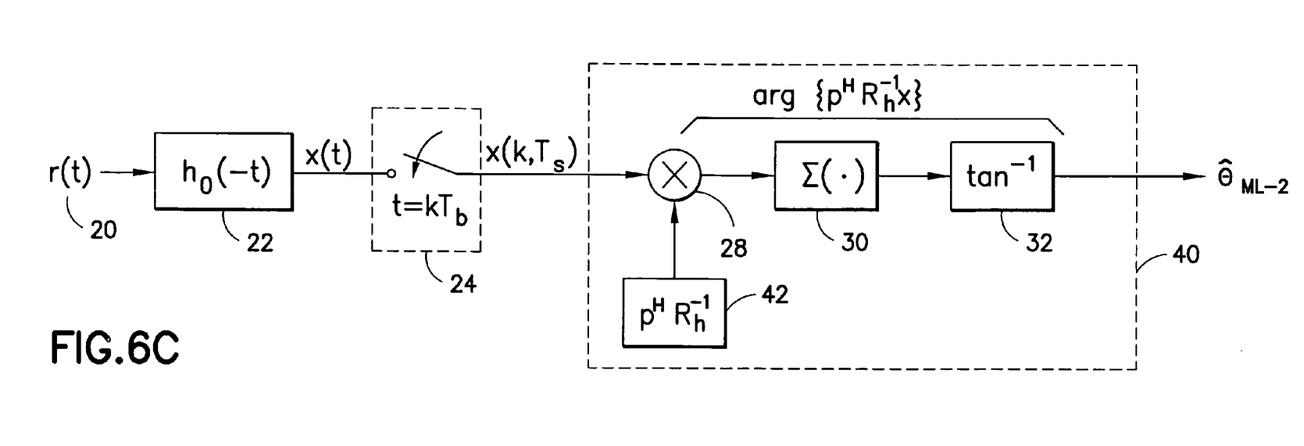

Each of the phase estimators described herein are shown in block diagram form at FIGS. 6A-C. FIG. 6A depicts the estimator $\theta_{ML}=\arg\{a^H x\}-\theta_{bias}$. A received signal r(t) 20 is input into a filter 22 that is matched to the first Laurent pulse $h_0(t)$. The output x(t) of the filter 22 passes through a sampler 24 that takes a sample every $T_b$ seconds so that the input into the phase estimator block 26 is $x(kT_s)$, wherein k=0, 1, 2 .... Each of the values $x(kT_b)$ are shifted into a register, which together form the vector x. Each of the values $x(kT_b)$ pass through a multiplier 28 along with a corresponding pseudo symbol $a_k$ 30, which alternates between purely real and purely imaginary. The output of the multiplier 28 is the input of an accumulator 30, which stores a running sum of the component-by-component product of the vectors x and a. The arctangent 32 of the accumulator output yields an uncorrected phase estimate $\theta_{unc}$. A second multiplier 28 takes the same pseudo symbols $a_k$ 30 and corresponding symbols p(k) 34, which each represent the k-th data symbol and the adjacent 2(L+1) data symbols (e.g., the ISI interference). The output of the multiplier 28 is input into another accumulator 30, which stores a running sum of the component-by-component product of the two vectors a and p. The inverse tangent 32 of that accumulator output yields a bias estimate $\theta_{bias}$, which is added 36 to the uncorrected phase estimate $\theta_{unc}$ to yield the bias-corrected phase estimate $\theta_{ML}$.

FIG. 6B depicts the estimator $\theta_{MF}=\arg\{a^H p\}$. Like reference numbers in FIGS. 6A-C denote like components. The sampled signal $x(kT_b)$ pass into an estimator block 38, wherein the values $x(kT_b)$ pass through a multiplier 28 along with a corresponding symbols p(k) 34. The output of the multiplier 28 is the input of an accumulator 30, which stores a running sum of the component-by-component product of the vectors x and p. The arctangent 32 of the accumulator output yields the phase estimate $\theta_{MF}$.

FIG. 6C depicts the estimator $\theta_{ML-2}=\arg\{p^H R_h^{-1} x\}$. The sampled signal $x(kT_b)$ pass into an estimator block 40, wherein the values $x(kT_b)$ pass through a multiplier 28 along with corresponding values of the vector $p^H R_h^{-1}$, wherein $R^{-1}$ is related to the autocovariance matrix defined in equation [14]. The output of the multiplier 28 is the input of an accumulator 30, which sums the dot product of the vectors x and $p^H R_h^{-1}$. The arctangent 32 of the accumulator output yields the phase estimate $\theta_{ML-2}$. Any of the phase estimates described in FIGS. 6A-C is then applied to demodulate the signal, even when $BT_b=\frac{1}{4}, \frac{1}{5}, \frac{1}{6}$ and lower, and for very low $L_0$.

Data-aided carrier phase estimation for GMSK using the serial or MSK-type detector has been discussed above. Previously published ML solutions were approximate, since partial integrations produced edge effects that reduced the performance of the estimator. The contribution of edge effects was shown to produce a bias in the maximum likelihood estimator. Once the bias is removed, the performance of the corrected (unbiased) ML estimator achieved the Cramer-Rao bound.

Two alternate solutions were also disclosed: one heuristic (denoted $\theta_{MF}$) and the other based on the maximum likelihood principle (denoted $\theta_{ML-2}$). The performance of $\theta_{ML-2}$ matches that of the corrected (unbiased) estimator $\theta_{ML}$. In fact, the performance of the two is identical when the approximation $$p(k) \approx \sum_{n=k-L}^{k+L} a_n R_h(-n)$$

is replaced by equality. In this case, $p=R_h a$, and the phase error variances are $E\{|\theta-\theta_{MF}|^2\}=[1/(2E_b/N_0)][1/(p^H R_h^{-1} p)]$. The performance of the estimator $\theta_{MF}$ is inferior to the other two.

The complexity of the estimator $\theta_{ML-2}$ is significantly greater than that of the estimator $\theta_{MF}$ since the former requires full-width multiplier to form the dot product. The estimator $\theta_{ML}$, on the other hand, only requires adds since the pseudo symbols are the set $\{-1, +1, -j, +j\}$ While described in the context of presently preferred embodiments, those skilled in the art should appreciate that various modifications of and alterations to the foregoing embodiments can be made, and that all such modifications and alterations remain within the scope of this invention. For example, the present invention is not limited only to GMSK systems used as an example, but may be applied to any modulated signal wherein smoothing of the waveform results in ISI. Examples herein are stipulated as illustrative and not exhaustive.

What is claimed is:

1. A method for determining a phase estimate comprising:
receiving a carrier signal r(t) that includes a known number of training bits $L_0$;
passing the received signal r(t) through a matched filter having filter output x(t);
sampling x(t) and combining the samples into a sample vector $x=e^{j\theta}p+v$ defining elements $[x(0), x(1), x(2), \ldots x(L_0-1)]^T$, wherein $\theta$ is a phase of the carrier signal, p is a data and intersymbol interference (ISI) vector defining elements $[p(0), p(1), p(2), \ldots p(L_0-1)]^T$, and v is a noise vector;
determining a phase estimate from an angle between the sample vector x and a vector derived from one of a pseudo-symbol vector a and the vector p,
wherein determining a phase estimate from the angle between x and a vector derived from a further comprises subtracting a phase bias estimate from said angle.

2. The method of claim 1 wherein the phase bias estimate is determined from an angle between p and a vector derived from a.

3. The method of claim 2 wherein the vector derived from a is a conjugate transpose $a^H$, and wherein the phase bias estimate is an inner product of p and $a^H$.

4. The method of claim 1 wherein the angle between the x and a vector derived from one of a and p is an inner product.

5. The method of claim 4 wherein the vector derived from one of a and p is one of a conjugate transpose $a^H$ and a conjugate transpose $p^H$.

6. The method of claim 5 wherein determining a phase estimate from an angle between x and $a^H$ comprises determining the inner product of x and $a^H$ and subtracting a phase bias estimate therefrom, the phase bias estimate defined as the inner product of p and $a^H$.

7. The method of claim 5 wherein the angle between the sample vector x and one of $a^H$ and $p^H$ is defined by an inner product of the respective vectors.

8. The method of claim 5 wherein the elements of $a^H$ alternate between purely real and purely imaginary numbers.

9. The method of claim 5 wherein the elements of $a^H$ are drawn from a set comprising $\{-1, +1, -j, +j\}$.

10. The method of claim 5 wherein the angle between x and p is defined by the inner product of x, $p^H$, and $R_h^{-1}$, wherein $R_h$ is proportional to an autocovariance matrix M of the noise vector v.

11. The method of claim 10 wherein $$R_h = \frac{2}{N_0} M,$$

wherein $N_0$ is a power spectral density of the noise vector v.

12. A detector for determining a phase estimate for a received phase-modulated signal r(t) comprising:

a matched filter for receiving a signal r(t) that defines a carrier phase θ, a sampler having an input coupled to an output of the matched filter for outputting a plurality of discrete samples x, each sample including a component p that p represents data and ISI, and a component v that represents noise, such that $x = e^{j\theta}p + v$; and a phase estimator block having an input coupled to an output of the sampler for determining a phase estimate, the phase estimate derived from an angle between a sample vector x and a vector derived from of one of a pseudo-symbol vector a and a data/ISI vector p, wherein x comprises elements x, a comprises pseudo symbol elements, and p comprises elements p, wherein the phase estimator block determines an uncorrected phase estimate from an angle between vectors x and a form of a, and subtracts a phase bias estimate from said angle.

13. The detector of claim 12 wherein the phase bias estimate is determined from an angle between p and a vector derived from a.

14. The detector of claim 13 wherein the vector derived from a is a conjugate transpose $a^H$ of a, and wherein the phase bias estimate is an inner product of p and $a^H$.

15. The detector of claim 12 wherein the angle between x and a vector derived from one of a and p is an inner product.

16. The detector of claim 15 wherein the vector derived from one of a and p is one of a conjugate transpose $a^H$ and a conjugate transpose $p^H$.

17. The detector of claim 16 wherein determining a phase estimate from an angle between x and $a^H$ comprises determining the inner product of x and $a^H$ and subtracting a phase bias estimate therefrom, the phase bias estimate defined as the inner product of p and $a^H$.

18. The detector of claim 16 wherein the angle between x and one of $a^H$ and $p^H$ is an inner product of the respective vectors.

19. The detector of claim 16 wherein the elements of $a^H$ alternate between purely real and purely imaginary numbers.

20. The detector of claim 16 wherein the elements of $a^H$ are drawn from a set consisting of $\{-1, +1, -j, +j\}$.

21. The detector of claim 16 wherein the angle between x and p is defined as the inner product of x, $p^H$, and $R_h^{-1}$, wherein $R_h$ is proportional to an autocovariance matrix M of the noise vector v.

22. The detector of claim 21 wherein $$R_h = \frac{2}{N_0} M,$$

and wherein $N_0$ is a power spectral density of the noise vector v.

23. A method for demodulating a phase-modulated signal comprising:

receiving a signal r(t) that includes a known number of bits $L_0$ used for estimating a phase;

passing the received signal r(t) through a filter having output x(t) that is matched to a first Laurent pulse $h_0(t)$ of the received signal r(t);

determining a phase estimate that accounts for bias introduced by using the first Laurent pulse $h_0(t)$; and demodulating the filter output x(t) using the phase estimate, wherein determining the phase estimate comprises determining a biased maximum likelihood phase estimate and subtracting a phase bias therefrom, wherein the biased maximum likelihood phase estimate is $\arg\{a^H x\}$, wherein $a^H$ is a vector of the form $[a^*(0), a^*(1), a^*(2), \ldots a^*(L_0-1)]$ representing pseudo symbols related to channel symbols and modulation index, wherein x is a vector of the form $[x(0), x(1), x(2), \ldots x(L_0-1)]^T$ representing the filter output, and further wherein $L_0$ represents a known number of bits in the received signal r(t), $a^*(k)$ denotes the complex conjugate of a psuedo symbol a(k), $a^H$ is the conjugate transpose of a vector a, and the superscript T represents a transpose operation.

24. The method of claim 23 wherein the phase bias is $\arg\{a^H p\}$, wherein p is a vector of the form $[p(0), p(1), p(2), \ldots p(L_0-1)]^T$ representing data and intersymbol interference in the filter output signal.

25. A method for demodulating a phase-modulated signal comprising:

receiving a signal r(t) that includes a known number of bits $L_0$ used for estimating a phase;

passing the received signal r(t) through a filter having output x(t) that is matched to a first Laurent pulse $h_0(t)$ of the received signal r(t);

determining a phase estimate that accounts for bias introduced by using the first Laurent pulse $h_0(t)$; and demodulating the filter output x(t) using the phase estimate, wherein the phase estimate equals $\arg\{p^H x\}$, wherein $p^H$ is a vector of the form $[p^*(0), p^*(1), p^*(2), \ldots p^*(L_0-1)]^T$ representing data and intersymbol interference in the filter output signal, x is a vector of the form $[x(0), x(1), x(2), \ldots x(L0-1)]^T$ representing the filter output, and further wherein $L_0$ represents a known number of bits in the received signal r(t), $p^*(k)$ denotes the complex conjugate of a psuedo symbol p(k), $p^H$ is the conjugate transpose of a vector p, and the superscript T represents a transpose operation.

26. A method for demodulating a phase-modulated signal comprising:

receiving a signal r(t) that includes a known number of bits $L_0$ used for estimating a phase;

passing the received signal r(t) through a filter having output x(t) that is matched to a first Laurent pulse $h_0(t)$ of the received signal r(t);

determining a phase estimate that accounts for bias introduced by using the first Laurent pulse $h_0(t)$; and demodulating the filter output x(t) using the phase estimate, wherein the phase estimate equals $\arg\{p^H R_h^{-1} x\}$, wherein $p^H$ is a vector of the form $[p^*(0), p^*(1), p^*(2), \ldots p(L_0-1)]^T$ representing data and intersymbol interference in the filter output signal, and x is a vector of the form $[x(0), x(1), x(2), \ldots x(L_0-1)]^T$ representing the filter output, and further wherein $L_0$ represents a known number of bits in the received signal r(t), $R_h^{-1}$ represents the inverse of the vector $R_h$, $R_h = M/\sigma^2$, M represents a covariance matrix, $p^*(k)$ represents the complex conjugate of p(k), $p^H$ is the conjugate transpose of a vector p, and the superscript T represents a transpose operation.

27. A serial detector for demodulating a received phase-modulated signal comprising: a filter having a filter output x(t) matched to a first Laurent pulse $h_0(t)$ of a received signal r(t); and a carrier phase estimator that applies a phase estimate to the filter output signal x(t), wherein the phase estimate corrects for a phase bias introduced by using the first Laurent pulse $h_0(t)$; wherein the phase bias is subtracted from a biased maximum likelihood phase estimate $\arg\{a^H x\}$, wherein $a^H$ is a vector of the form $[a^*(0), a^*(1), a^*(2), \ldots a^*(L_0-1)]$ representing pseudo symbols related to channel symbols and a modulation index, wherein x is a vector of the form $[x(0), x(1), x(2), \ldots x(L_0-1)]^T$ representing the filter output, and further wherein $L_0$ represents a known number of bits in the received signal r(t), $a^*(k)$ denotes the complex conjugate of a psuedo symbol a(k), $a^H$ is the conjugate transpose of a vector a, and the superscript T represents a transpose operation.

28. A serial detector for demodulating a received phase-modulated signal comprising: a filter having a filter output x(t) matched to a first Laurent pulse $h_0(t)$ of a received signal r(t); and a carrier phase estimator that applies a phase estimate to the filter output signal x(t), wherein the phase estimate corrects for a phase bias introduced by using the first Laurent pulse $h_0(t)$; wherein the phase bias is $\arg\{a^H p\}$, wherein $a^H$ is a vector of the form $[a^*(0), a^*(1), a^*(2), \ldots a^*(L_0-1)]$ representing pseudo symbols related to channel symbols and a modulation index, wherein p is a vector of the form $[p(0), p(1), p(2), \ldots p(L_0-1)]^T$ representing data and intersymbol interference in the filter output signal, and further wherein $L_0$ represents a known number of bits in the received signal r(t), $a^*(k)$ denotes the complex conjugate of a psuedo symbol a(k), $a^H$ is the conjugate transpose of a vector a, and the superscript T represents a transpose operation.

29. A serial detector for demodulating a received phase-modulated signal comprising: a filter having a filter output x(t) matched to a first Laurent pulse $h_0(t)$ of a received signal r(t); and a carrier phase estimator that applies a phase estimate to the filter output signal x(t), wherein the phase estimate corrects for a phase bias introduced by using the first Laurent pulse $h_0(t)$; wherein the phase estimate equals $\arg\{p^H x\}$, wherein $p^H$ is a vector of the form $[p^*(0), p^*(1), p^*(2), p^*(L_0-1)]^T$ representing data and intersymbol interference in the filter output signal, x is a vector of the form $[x(0), x(1), x(2), x(L_0-1)]^T$ representing the filter output, and further wherein $L_0$ represents a known number of bits in the received signal r(t), $p^*(k)$ denotes the complex conjugate of a psuedo symbol p(k), $p^H$ is the conjugate transpose of a vector p, and the superscript T represents a transpose operation.

30. A serial detector for demodulating a received phase-modulated signal comprising: a filter having a filter output x(t) matched to a first Laurent pulse $h_0(t)$ of a received signal r(t); and a carrier phase estimator that applies a phase estimate to the filter output signal x(t), wherein the phase estimate corrects for a phase bias introduced by using the first Laurent pulse $h_0(t)$; wherein the phase estimate equals $\arg\{p^H R_h^{-1} x\}$, wherein $p^H$ is a vector of the form $[p^*(0), p^*(1), p^*(2), \ldots p^*(L_0-1)]^T$ representing data and intersymbol interference in the filter output signal, and x is a vector of the form $[x(0), x(1), x(2), \ldots x(L_0-1)]^T$ representing the filter output, and further wherein $L_0$ represents a known number of bits in the received signal r(t), $R_h^{-1}$ represents the inverse of the vector $R_h$, $R_h = M/\sigma^2$, M represents a covariance matrix, $p^*(k)$ represents the complex conjugate of p(k), $p^H$ is the conjugate transpose of a vector p, and the superscript T represents a transpose operation.

* * * * *